3,402,042
RECOVERY OF NICKEL AND COBALT FROM AN AQUEOUS SOLUTION

Lyall J. Lichty, Phoenix, Ariz., assignor to Northfield Mines, Incorporated, a corporation of Delaware
No Drawing. Filed Mar. 24, 1965, Ser. No. 442,509
18 Claims. (Cl. 75—119)

ABSTRACT OF THE DISCLOSURE

Nickel and cobalt are extracted from a dilute aqueous solution of these metals at a pH between about 3 and 6 with a substantially water insoluble organo hydrogen phosphate ester in which at least one and not more than two of the hydrogen atoms of the phosphoric acid are replaced by an organic radical containing at least eight carbon atoms.

---

This invention relates to the recovery of nickel and cobalt from dilute aqueous solutions of these metals, and more particularly it relates to a process for extracting the nickel and cobalt content of such solutions with a selective organic solvent for these metals.

United States Patent 3,130,043 to Lichty describes a method for the recovery of nickel and cobalt from low-grade ores of these metals by leaching the desired metal values thereform with a dilute aqueous solution of sodium chloride acidified with sulfuric acid. The leach liquor obtained as a result of the leaching operation contains from 0.5 to 10 grams of nickel and cobalt per liter of solution, and this liquor is then treated to recover the nickel and cobalt content thereof. Several ways for recovering the nickel and cobalt values of the leach liquor have been employed, among which are the use of hydrogen sulfide, sodium sulfide, lime and magnesia as precipitants for the nickel and cobalt. However, although precipitates containing up to about 30% by weight of nickel and cobalt have been recovered by these means, the procedure is not entirely satisfactory from a commercial standpoint because of the cost of further treatment of the large quantity of precipitated sulfides and other materials obtained from which the nickel and cobalt values must be separated.

I have now developed a new process for recovering nickel and cobalt from dilute aqueous solutions of these metals which is particularly useful in the treatment of nickel- and cobalt-containing brine leach liquors produced pursuant to the process of the aforementioned patent. My new process is based on the discovery, that by the use of a suitable selective organic solvent for the nickel and cobalt ions, and by careful control of the pH of the aqueous solution and of other conditions under which the extraction is carried out, the nickel and cobalt ions can be recovered from the aqueous solution by known solvent extraction techniques.

The process of my invention comprises first adjusting the pH of the dilute nickel- and cobalt-containing solution so that it has a pH of from about 3 to that pH at which he hydroxides of nickel and cobalt commence to form, and preferably so that it has a pH of between about 4 to 6. The acidic aqueous solution is then contacted with a selective, water-insoluble organic solvent for nickel and cobalt ions for a sufficient period of time to effect substantially complete transfer of the nickel and cobalt from the aqueous phase to the organic phase of the system. The selective organic solvent comprises essentially a water-insoluble organo hydrogen phosphate ester wherein at least one and not more than two of the hydrogen atoms of the phosphoric acid are replaced by an organic radical that contains at least eight carbon atoms and that is selected from the group consisting of aryl, alkyl and aralkyl radicals. After the transfer of the nickel and cobalt ions to the organic phase is substantially complete, the nickel- and cobalt-containing water-insoluble organic solvent is separated from the nickel- and cobalt-poor aqueous solution. The nickel- and cobalt-containing organic solvent is then contacted with an aqueous solution of sulfuric acid for a sufficient period of time to effect transfer of the nickel and cobalt ions from the organic phase to the aqueous phase of this system, the organic solvent concurrently being reconverted to the original organo hydrogen phosphate. The nickel- and cobalt-containing acidic aqueous solution is then separated from the reconstituted organic solvent, and the nickel and cobalt values are recovered therefrom by conventional procedures.

The process of my invention may be used to extract and recover the nickel and cobalt content of a wide range of dilute aqueous solutions containing recoverable amounts of these metals, and it is particularly useful in the recovery of nickel and cobalt from solutions containing between 0.5 and 10 or somewhat more grams of these metals per liter of the solution. Leach liquors obtained by the leaching of low-grade nickel ores with acidified sea water pursuant to the process of United States Patent 3,130,043 contain between 0.5 and 10 grams per liter of nickel and cobalt and up to 100 grams per liter of sodium chloride, and my new process was specifically developed to recover the nickel and cobalt content of these brine leach liquors.

As previously noted, I have found that the nickel and cobalt content of such dilute solutions of these metals can be extracted therefrom with certain selective organic solvents that are hereinafter more fully described, provided the pH of the aqueous solution is adjusted, for example, by the addition of a mineral acid or base thereto, so that the pH is at least about 3 and is below that pH at which the hydroxides of nickel and cobalt commence to form, and preferably is between a pH of about 4 to 6. The selective organic solvent is of the so-called ion exchange type and therefore it must be substantially immiscible with water, and particularly with the acidic nickel- and cobalt-containing aqueous solutions being treated therewith. The organic solvent comprises an organic ester of phosphoric acid wherein at least one but not more than two of the hydrogen atoms of the phosphoric acid are replaced by an organic radical having at least eight and preferably not more than twenty carbon atoms, the organic radical being selected from the group consisting of alkyl, aryl and aralkyl radicals. That is to say, the selective solvent is an organo hydrogen phosphate ester that can be represented by the formula:

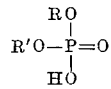

where R can be either an alkyl, aryl or aralkyl radical containing more than eight carbon atoms and R' can be either one of the aforesaid organic radicals or hydrogen. I presently prefer to use di(2-ethylhexyl)phosphoric acid, but heptadecyl, dodecyl, and many other derivatives of phosphoric acid may be employed provided these derivatives are substantially water-insoluble and contain at least one hydrogen atom of the phosphoric acid available for ion exchange transfer.

The selective organic solvent is preferably dissolved in an inert organic diluent that is immiscible with water. The organic diluent may be one or more of the aliphatic or aromatic hydrocarbons, the halogenated derivatives of these hydrocarbons, petroleum fractions and their derivatives, and mixtures of these organic substances, although of these I presently prefer to use kerosene as the diluent for the selective organic solvent. The concentration of the organo hydrogen phosphate ester in the inert organic diluent is not critical and can be adjusted over wide limits to obtain the most efficient extraction of the nickel and cobalt from the aqueous solution and to control phase separation characteristics of the aqueous/organic ion exchange system. However, I presently prefer to use a concentration of between 5 to 25% by weight of the organo hydrogen phosphate ester in kerosene.

The nickel- and cobalt-containing acidic solution is brought into intimate ion exchange relationship with the selective organic solvent by conventional procedures for contacting immiscible liquids. For example, the aqueous and organic phases can be intimately mixed together by means of vigorous agitation in a conventional mixing vessel, or, preferably, the two phases are brought into intimate contact in a conventional counterflow solvent extraction tower advantageously packed with ceramic or other packing materials. The nickel and cobalt values are transferred to the organic phase by what is essentially an ion exchange reaction which may be represented by the following equation:

$$2\ RR'HPO_4 + Ni^{++} \rightarrow Ni(RR'PO_4)_2 + 2H^+$$

On completion of the ion exchange reaction the nickel and cobalt content of the aqueous phase is reduced to below about 0.5, and preferably to below about 0.2 gram per liter of the solution. Moreover, by appropriate control of the aqueous/organic phase ratio of the system and the concentration of the organo hydrogen phosphate in the organic phase, it is possible to increase the concentration of nickel and cobalt from, say, about 2 grams per liter in the aqueous phase to about 8 to 10 grams per liter in the organic phase.

The nickel and cobalt enriched organic phase is separated from the nickel and cobalt depleted aqueous phase, and the organic phase is subjected to further treatment with an acidic aqueous solution to recover the nickel and cobalt content thereof. That is to say, the nickel- and cobalt-containing organic solution is brought into ion exchange relationship with an aqueous solution of sulfuric acid whereby the nickel and cobalt values are transferred from the organic phase to the aqueous phase by what is essentially the reverse of the ion exchange reaction previously described. The hydrogen ions transferred to the organic phase in the course of this ion exchange reaction reconstitute the organo hydrogen phosphate ester to its initial form, while, by appropriate control of the concentration of the sulfuric acid solution and the phase ratio of this solution to the organic solution in the aqueous/organic system, an acidic nickel- and cobalt-containing aqueous solution is obtained which will contain up to 50 grams per liter or more of the metals being recovered.

The nickel and cobalt metal values are now present in a relatively concentrated aqueous solution and they can be recovered therefrom by electrolysis, or by precipitation in the form of their respective metal hydroxides or sulfides, or by evaporation to produce crystals of the metal sulfates, or by other known techniques. The reconstituted organo hydrogen phosphate ester is recycled to the start of the process where it is employed to extract the nickel and cobalt values from a further quantity of the dilute nickel- and cobalt-containing solution.

The following specific examples are illustrative but not limitative of the practice of my invention.

Example I

An aqueous solution containing 2 grams per liter of nickel present therein in the form of nickel sulfate was acidified with sulfuric acid so that the resulting solution had a pH of 6.2. The nickel-containing acidic solution was then intimately contacted with a 5% solution of di(2-ethyhexyl)phosphoric acid in kerosene, the phase ratio of the aqueous phase to the organic phase of the aqueous/organic system being about 3. Nickel was transferred to the organic phase of the system to produce a nickel organo phosphate dissolved in kerosene and containing about 5 grams of nickel per liter, and the organic nickel-containing organic phase was separated from the nickel-poor aqueous phase. The nickel organo phosphate was then intimately contacted with dilute sulfuric acid, the phase ratio of the nickel-containing organic phase to the sulfuric acid-containing aqueous phase being about 5. The nickel ions transferred from the organic phase to the aqueous phase to produce an acidic solution containing 24 grams per liter of nickel. The organic phase, stripped of its nickel content, was reconstituted to the original organo hydrogen phosphate ester and was employed to extract more nickel from an additional quantity of the dilute nickel-containing solution.

Example II

The procedure described in Example I was repeated with a solution containing 5 grams of nickel per liter of the solution, 1 gram per liter of cobalt and 20 grams per liter of sodium chloride with essentially the same results as were obtained in Example I.

From the foregoing description of my new process for recovering nickel and cobalt from dilute aqueous solutions of these metals it will be seen that I have made an important contribution to the art to which my invention relates.

I claim:
1. Process for the recovery of nickel and cobalt from a dilute aqueous solution of these metals which comprises
    adjusting the pH of the solution so that it is at least about 3 and below that pH at which the hydroxides of nickel and cobalt form,
    contacting said nickel- and cobalt-containing aqueous solution with a selective, water-insoluble organic solvent for nickel and cobalt ions for a sufficient period of time to affect substantially complete transfer of the nickel and cobalt ions from the aqueous phase to the organic phase of the system,
    said selective organic solvent comprising essentially a water-insoluble organo hydrogen phosphate ester wherein at least one and not more than two of the hydrogen atoms of said phosphoric acid are replaced by an organic radical containing at least eight carbon atoms, said organic radical being selected from the group consisting of aryl, alkyl and aralkyl radicals,
    separating the nickel- and cobalt-containing water-insoluble organic solvent from the nickel and cobalt depleted aqueous solution,
    contacting the nickel- and cobalt-containing organic solvent with an aqueous solution of sulfuric acid for a sufficient period of time to effect transfer of the nickel and cobalt ions from the organic phase to the aqueous phase of the system and concurrently to reconvert the organic solvent to the corresponding organo hydrogen phosphate,
    separating the nickel- and cobalt-containing acidic aqueous solution from the reconstituted organic solvent,
    and recovering the nickel and cobalt content of said aqueous solution.

2. The process according to claim 1 in which the dilute aqueous solution initially contains between about 0.5 and 10 grams of nickel and cobalt per liter of solution.

3. The process according to claim 1 in which the dilute aqueous solution contains between about 10 and 100 grams of sodium chloride per liter of solution.

4. The process according to claim 1 in which the pH of the nickel- and cobalt-containing aqueous solution is adjusted so that it is between 4 and 6.

5. The process according to claim 1 in which each organic radical of the organo hydrogen phosphate ester contains from eight to twenty carbon atoms.

6. The process according to claim 1 in which the organo hydrogen phosphate ester is di(2-ethylhexl)phosphoric acid.

7. The process according to claim 1 in which the organo hydrogen phosphate ester is dissolved in an inert water-insoluble organic diluent.

8. The process according to claim 7 in which the solution of said organo hydrogen phosphate ester in said organic diluent contains from 5 to 25% by weight of said ester.

9. The process according to claim 7 in which the organic diluent is kerosene.

10. Process for the recovery of nickel and cobalt from a dilute aqueous solution of these metals, said solution containing between about 0.5 and 10 grams of nickel and cobalt and between about 10 and 100 grams of sodium chloride per liter of solution, which comprises adjusting the pH of the solution so that it is at least about 3 and below that pH at which the hydroxides of nickel and cobalt commence to form, contacting said nickel- and cobalt-containing aqueous solution with a selective water-insoluble organic solvent for nickel and cobalt ions for a sufficient period of time to effect substantially complete transfer of the nickel and cobalt ions from the aqueous phase to the organic phase of the system, said selective organic solvent comprising essentially a water-insoluble organo hydrogen phosphate ester wherein at least one and not more than two of the hydrogen atoms of said phosphoric acid are replaced by an organic radical containing at least eight carbon atoms, said organic radical being selected from the group consisting of aryl, alkyl and aralkyl radicals, separating the nickel- and cobalt-containing water-insoluble organic solvent from the nickel and cobalt depleted aqueous solution, contacting the nickel- and cobalt-containing organic solvent with an aqueous solution of sulfuric acid for a sufficient period of time to effect transfer of the nickel and cobalt ions from the organic phase to the aqueous phase of the system and concurrently to reconvert the organic solvent to the corresponding organo hydrogen phosphate, separating the nickel- and cobalt-containing acidic aqueous solution from the reconstituted organic solvent, and recovering the nickel and cobalt content of said aqueous solution.

11. The process according to claim 10 in which the pH of the nickel- and cobalt-containing aqueous solution is adjusted so that it is between 4 and 6.

12. The process according to claim 10 in which the organo hydrogen phosphate ester is di(2-ethylhexyl) phosphoric acid.

13. The process according to claim 10 in which each organic radical of the organo hydrogen phosphate ester contains from eight to twenty carbon atoms.

14. The process according to claim 10 in which the organo hydrogen phosphate ester is dissolved in an inert water-insoluble diluent.

15. The process according to claim 14 in which the solution of said organo hydrogen phosphate ester in said organic diluent contains from 5 to 25% by weight of said ester.

16. The process according to claim 14 in which the organic diluent is kerosene.

17. The process according to claim 10 in which the organo hydrogen phosphate ester is di(2-ethylhexyl)phosphoric acid and the organic diluent is kerosene.

18. The process according to claim 17 in which the solution of said organo hydrogen phosphate ester in said organic diluent contains from 5 to 25% by weight of said ester.

References Cited

UNITED STATES PATENTS

| | | | |
|---|---|---|---|
| 2,954,276 | 9/1960 | Hazen | 75—119 |
| 3,130,043 | 4/1964 | Lichty | 75—115 |
| 3,193,381 | 7/1965 | George et al. | 75—108 |
| 3,276,863 | 10/1966 | Drobnick et al. | 75—119 |

HYLAND BIZOT, *Primary Examiner.*